US012496411B2

(12) United States Patent
Dombrowski et al.

(10) Patent No.: US 12,496,411 B2
(45) Date of Patent: Dec. 16, 2025

(54) SEALING FILM WITH A SEPARABLE SUPPORT STRUCTURE FOR TAMPER EVIDENT PROTECTION

(71) Applicant: Solventum Intellectual Properties Company, Maplewood, MN (US)

(72) Inventors: Alan R. Dombrowski, Woodbury, MN (US); Adam S. Troness, Dellwood, MN (US); Aniruddha A. Upadhye, Saint Paul, MN (US); Katelyn M. Leniczek, Saint Paul, MN (US); Mitchell A. F. Johnson, Woodbury, MN (US); Thomas R. J. Corrigan, Saint Paul, MN (US); Lacey M. Strand, St. Paul, MN (US)

(73) Assignee: Solventum Intellectual Properties Company, Maplewood, MN (US)

( * ) Notice: Subject to any disclaimer, the term of this patent is extended or adjusted under 35 U.S.C. 154(b) by 0 days.

(21) Appl. No.: 18/722,849

(22) PCT Filed: Dec. 28, 2022

(86) PCT No.: PCT/IB2022/062821
§ 371 (c)(1),
(2) Date: Jun. 24, 2024

(87) PCT Pub. No.: WO2023/126841
PCT Pub. Date: Jul. 6, 2023

(65) Prior Publication Data
US 2025/0058058 A1    Feb. 20, 2025

Related U.S. Application Data

(60) Provisional application No. 63/293,941, filed on Dec. 27, 2021.

(51) Int. Cl.
*A61M 5/00*   (2006.01)
*A61M 5/50*   (2006.01)

(52) U.S. Cl.
CPC .......... *A61M 5/5086* (2013.01); *A61M 5/002* (2013.01); *A61M 2205/583* (2013.01)

(58) Field of Classification Search
CPC ........... A61J 1/00; A61M 5/002; B65D 65/14; B65D 75/20; B65D 75/22
(Continued)

(56) References Cited

U.S. PATENT DOCUMENTS

| 3,575,782 A | 4/1971 | Hansen |
| 4,984,585 A | 1/1991 | Austad |

(Continued)

FOREIGN PATENT DOCUMENTS

| WO | 2007146820 A2 | 12/2007 |
| WO | 2016025737 A1 | 2/2016 |
| WO | 2021024139 W | 2/2021 |

OTHER PUBLICATIONS

Handbook of Adhesives 3rd Edition, Ed. I. Skeist, 1990, New York, Van Nostrand Reinhold (p. 305).
(Continued)

*Primary Examiner* — Jacob K Ackun

(57) ABSTRACT

The disclosed sealing film is for surrounding a device for tamper evident protection of the contained device. The sealing film has a backing with a perimeter surrounding a central area and an adhesive on the backing at least at the perimeter of the backing. A tamper evident layer is separably connected to the backing along a substantial portion of the perimeter of the backing. Therefore, attempted peeling, pulling, opening of the sealing film will cause the tamper evident layer to remove from the backing and indicate tampering.

15 Claims, 2 Drawing Sheets

(58) Field of Classification Search
USPC .................. 206/484, 484.2, 363, 370, 807; 229/87.01, 87.05
See application file for complete search history.

(56) References Cited

U.S. PATENT DOCUMENTS

| | | | |
|---|---|---|---|
| 5,181,364 A * | 1/1993 | Weder | G09F 23/00 229/87.01 |
| 6,156,424 A | 12/2000 | Taylor | |
| 6,250,468 B1 * | 6/2001 | Huchel | B65D 75/5844 229/87.05 |
| 6,364,113 B1 | 4/2002 | Faasse, Jr. et al. | |
| 2008/0203141 A1 * | 8/2008 | Friebe | B65D 75/30 229/87.05 |
| 2012/0000804 A1 * | 1/2012 | Barnes | A61L 2/26 53/425 |
| 2017/0348477 A1 | 12/2017 | Tomlinson et al. | |

OTHER PUBLICATIONS

International Search Report for PCT International Application No. PCT/IB2022/062821 mailed on Mar. 15, 2023, 5 pages.

Neoprene Latex: Principles of Compounding and Processing, J. C. Carl, 1962, Delaware, E.I: DuPontde Nemours (see section entitled Contact Bond Adhesives, p. 100).

* cited by examiner

SEALING FILM WITH A SEPARABLE SUPPORT STRUCTURE FOR TAMPER EVIDENT PROTECTION

CROSS REFERENCE TO RELATED APPLICATIONS

This application is a national stage filing under 35 U.S.C. 371 of PCT/IB2022/062821, filed Dec. 28, 2022, which claims the benefit of U.S. application Ser. No. 63/293,941, filed Dec. 27, 2021, the disclosure of which is incorporated by reference in its entirety herein.

TECHNICAL FIELD

The present disclosure relates to a sealing film with a separable tamper evident layer to show tampering. In particular, the present disclosure relates to a sealing film for surrounding a device, where the sealing film has a separable tamper evident layer so that attempted peeling, pulling, opening of the sealing film will cause the separable tamper evident layer to separate and indicate tampering.

BACKGROUND

Patients receiving medical care will commonly have a medical access device, such as a vascular access device, inserted to assist the healthcare provider in delivering medications to the patient. Some medical access devices are for allowing fluids to be removed from a patient, like a urinary catheter or a surgical drain line. When a person is under the care of a healthcare provider it is important to control the medications that are delivered to the patient. Patients with psychiatric conditions, intellectually delayed patients, pediatric patients, or intravenous drug users may tamper with intravenous access points or intentionally deliver drugs or medications to the vascular access device. Unprescribed drugs entering the vascular access device can cause medical problems, drug interactions, blood stream infections.

SUMMARY

Tamper evident devices can be used for enclosing a device, such as a medical access device, where attempts at accessing the enclosed device destructively impact the tamper evident device. For example, PCT publication WO 2021/024139 describes various tamper-evident closures and ones that include adhesive coated film. There remains a need for better visual indication when attempts to separate the adhesive-coated film are made. The disclosed scaling film includes a backing layer and a separable tamper evident layer, such that when the sealing film surround a device. attempted peeling, pulling, opening of the scaling film will cause the tamper evident layer to separate from the backing and indicate tampering.

In one embodiment. the sealing film for surrounding a device comprises a backing having a first major surface and second major surface, opposite the first major surface and having a perimeter surrounding a central area, wherein the backing forms a first backing portion and second backing portion. The sealing film has an adhesive on the first major surface of the backing at least at the perimeter. The sealing film further has a tamper evident layer separably connected to the second major surface of the backing and extending along a substantial portion of the perimeter. In one embodiment, the adhesive at the first backing portion contacts the second backing portion to form an adhesive bond the force to break the adhesive bond is greater than the force to separate the tamper evident layer from the backing.

To use the sealing film. a device is place within the central area of the backing, and then the sealing film is wrapped around the device such that the adhesive at the first backing portion contacts the second backing portion, which may also have adhesive. The tamper evident layer forms the outermost layer of the sealing film. The force to break the adhesive bond is greater than the force to separate the tamper evident layer from the backing layer. Tampering would be evident because the tamper evident layer removes from the underlying backing. Typically, the tamper evident layer is a different color or transparency from the underlying backing to enhance the visual impact of the removed tamper evident layer.

Figure 1:
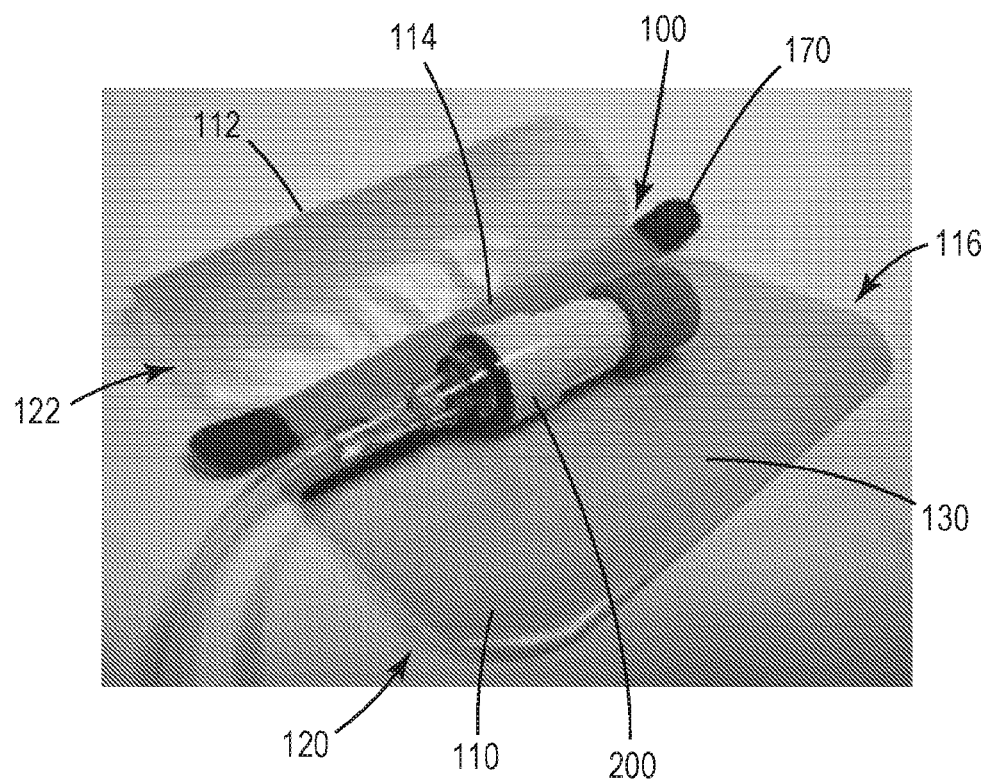
FIG. 1 is a perspective view of one embodiment of a sealing film for tamper-evident protection of a device.

While the above-identified drawings and figures set forth embodiments of the invention, other embodiments are also contemplated. as noted in the discussion. In all cases, this disclosure presents the invention by way of representation and not limitation. Numerous other modifications and embodiments can be devised by those skilled in the art. which fall within the scope and spirit of this invention. The figures may not be drawn to scale.

DETAILED DESCRIPTION

Various designs for a sealing film 100 for use around a device 200, such as a medical device 200 with fluid access lines to a patient, are disclosed. The disclosed sealing film 100 has a backing 110 and a tamper evident layer 180. An adhesive 130 is on the backing 110 and in use enables the sealing film 100 to seal around the device 200. The tamper evident layer 180 is separable from the backing 110 of the sealing film 100 such that in use the force to break the adhesive bond formed by adhesive 130 is greater than the force to separate the tamper evident layer 180 from the backing 110 at the perimeter 112. With the tamper evident layer 180 separated from the backing 100, tampering would be evident.

Figure 2:
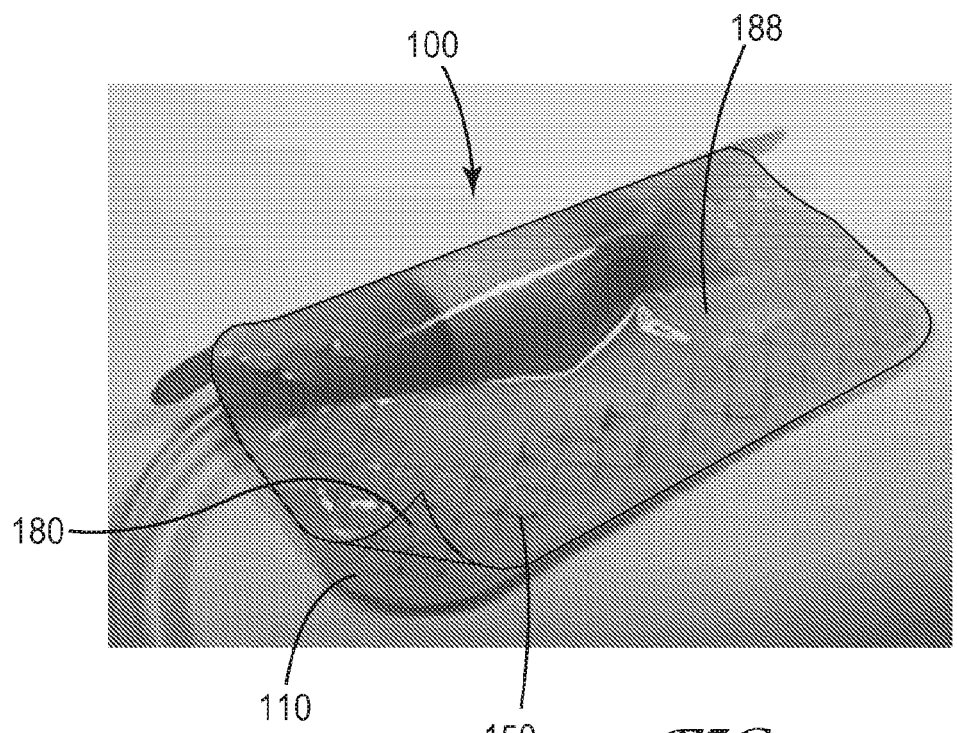
FIG. 2 is a perspective view of the sealing film of FIG. 1 closed around the device.
Figure 3:
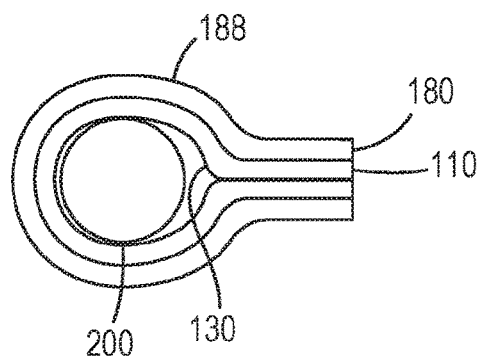
FIG. 3 is a side sectional view of the sealing film of FIG. 2 surrounding the device.

FIG. 1 shows one embodiment of the sealing film 100 for tamper-evident protection of a device 200. FIG. 2 shows the sealing film 100 of FIG. 1 closed around the device 200. FIG. 3 shows a cross section of the sealing film 100 around the device 200 of FIG. 2.

The backing 110 has a perimeter 112 surrounding a central area 114. The backing 110 has a first major surface 116 and a second major surface 118 opposite the first major surface 116. The backing 110 overall has a first backing portion 120 and a second backing portion 122. Typically, the backing 110 is symmetrical across the first backing portion 120 and second backing portion 122 such that when the backing 110 is folded over the device 200, such as shown in FIG. 2, the perimeter 112 is able to substantially align at the first backing portion 120 and second backing portion 122.

In some embodiment, and similar to what is described in PCT publication WO 2021/024139, the disclosure of which is herein incorporated by reference, the backing can include a tear strip 170. The tear strip 170 is the portion of the sealing label 100 used to internally open the sealing film 100 after it has been enclosed around the device 200. In this embodiment, there are perforations between the tear strip 170 and the backing 110 to allow the tear strip 170 to easily separate from the backing 110. To use the tear strip 170, when the sealing film 100 is enclosed around the device 200, such as in FIG. 2, to gain access into the device 200, the tear strip 170 is irreversibly removed from the backing 110 and the sealing film 100 cannot close again over the device 200. In some embodiment, when the backing 110 is a very thin flexible material, the tear strip 170 can include a stiffening layer to make the tear strip 170 protrude and allow for it to be more easily gripped at removal.

The backing 110 is generally thin, flexible, conformable, and drapable. The backing 110 maybe formed from a number of different materials. Typically, the backing 110 would not be easily punctured or if punctured, a puncture would be apparent. Typically, the backing 110 has structural integrity to not easily rip or tear. The backing 110 may be made from polymeric films, foams, paper, non-woven and woven fibrous webs, knits. In some embodiment, the backing 110 is hydrophobic and water resistant which will prevent fluids and other contaminants from absorbing into the backing 110. In some embodiments, the backing 110 is transparent to allow for viewing of the device 200.

A polymeric film backing 110 is well suited for the backing for the toughness and elasticity. For example. the polymeric backing can be formed form polyurethane, polyester, polyether block amide, polyethylene, LDPE, metallocene polyolefins. and SBS and SIS block copolymer materials.

Having a relatively thin and elastomeric backing 110 allows for the backing to be wrapped around the device 200 with the backing 110 closely fitting around the various conformities of the device 200, such as can be seen in FIG. 2. When the backing 110 is slightly elastomeric, the backing 110 can stretch, pull, expand to get a close fit without ripping, tearing, or puncturing the backing 110 while surrounding the device 200. This close fit prevents the inserted device 200 from falling or being pulled out from the surrounding sealing film 100.

Elasticity can be measured in any number of commonly used means for evaluating stretch and recovery of a material. In one embodiment, the backing 110 has an elongation to break of at least 200%. In one embodiment, the backing 110 has an elongation to break of less than 500%. In one embodiment, the backing 110 has an elongation of break greater than 20% and less than 100%. Elasticity can be measured by an initial modulus of elasticity, which is the force require to apply a specified amount of stretch. In one embodiment, the backing layer 110 has a modulus, at 10% elongation, of less than 5 Newtons. In one embodiment, the backing layer 110 has a modulus, at 10% elongation, of greater than 2 Newtons.

Thinner materials tend to be more conformable. In one embodiment, the backing 110 has a thickness less than 100 micrometer; in one embodiment, the backing 110 has a thickness less than 10 micrometers; in one embodiment the backing 110 has a thickness less than 1 micrometers.

The adhesive 130 is on the first major surface 116 of the backing 110. In use, the backing 110 folds around the device 200 and the adhesive 130 on the first major surface 116 at the first backing portion 120 contact second backing portion 122. The second backing portion 122 at the first major surface might optionally also have adhesive 130. When the sealing film 100 is wrapped around the device 200, the adhesive 130 bond the first backing portion 120 to the second backing portion 122.

The adhesive 130 is typically a permanent adhesive. A permanent adhesive is strong and upon contact with the surface to which the adhesive contacts, the bond is not easily broken. In this embodiment, the integrity of the underlying material will break before the adhesive bond breaks.

Figure 5:
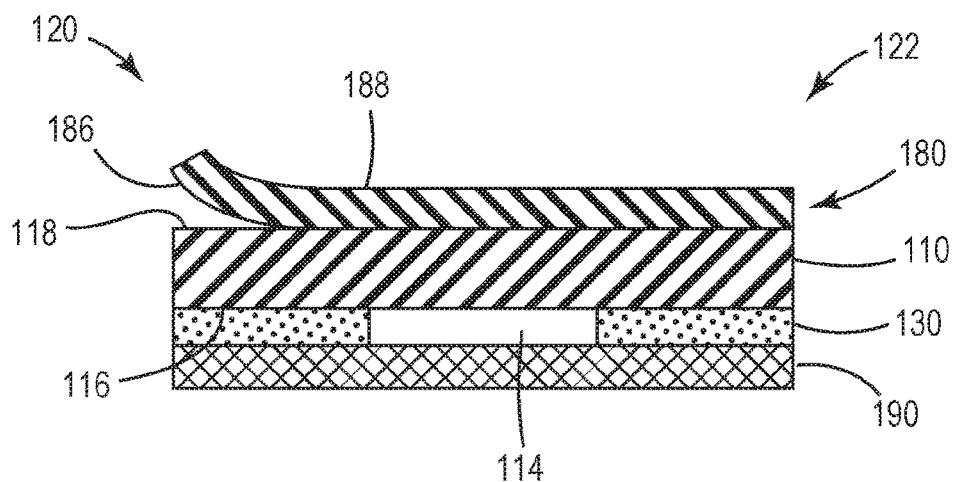
FIG. 5 is a side sectional view of the sealing film.

In one embodiment, the adhesive 130 can be a pressure sensitive adhesive, where the adhesive 130 feels wet, or sticky to the touch and can secure to the targeted surface upon contact. 3M VHB™ M Tape, available from 3M Company, has a permanent, pressure sensitive adhesive. When a pressure sensitive adhesive is used, to prevent the adhesive 130 from sticking strongly to the enclosed device 200, the central area 114 of the first major surface 116 either does not have adhesive 130, the adhesive 130 had been detackified, or the adhesive 130 is covered. FIG. 5 shows the central area 114 without adhesive 130.

In one embodiment, the adhesive 130 is a contact adhesive. A contact adhesive is particularly well suited for use with the sealing film because it is an adhesive that sticks strongly to itself but typically does not stick well to other materials. Sometimes a contact adhesive is referred to as a cohesive, where the bond is stronger than the integrity of the underlying material. A contact adhesive works well because the contact adhesive will not strongly adhere to the device 200, the users hands, medical practitioner's gloves, or tubing. Contact adhesives will typically secure quickly on contact and form an immediate bond. Further, in an embodiment when a contact adhesive is used, then the entire first major surface 116 could be covered with adhesive 130 because the adhesive 130 will not stick strongly to the device 200. Fully coating the first major surface 116 with the adhesive 130 simplifies manufacturing the sealing film 100.

Suitable materials for providing cohesive properties may be either elastomeric or non-elastomeric polymeric binders. Elastomeric polymeric binder typically provide long-term flexibility, extensibility and/or elasticity. Suitable elastomeric polymeric binders may comprise natural rubber latex, a synthetic latex, such as homopolymer and copolymer latexes of acrylics, butadienes, styrene/butadiene rubbers, chloroprenes, ethylenes (e.g., vinyl acetate/ethylene), isoprenes, nitriles and urethanes, or mixtures thereof. Examples of suitable polymeric elastomeric binders are disclosed for example in U.S. Pat. Nos. 3,575,782; 4,984,585; and 6,156,424 as well as in textbooks, such as Neoprene Latex: Principles of Compounding and Processing, J.C. Carl, 1962, Delaware, E.I: DuPont de Nemours (e.g., under the section entitled Contact Bond Adhesives, on page 100) and Handbook of Adhesives $3^{rd}$ Edition, Ed. I, Skeist, 1990, New York, Van Nostrand Reinhold (e.g., page 305). Outer bandages may be desirably free of natural rubber latex. 3M Scotch Flex & Seal Shipping Roll, available from 3M Company, is an example of a suitable contact adhesive.

FIG. 5 is a side sectional view of the sealing film 100 in an embodiment where the central area 114 is free of adhesive 130. In this embodiment, the backing 110 is has adhesive 130 at the first backing portion on the first major surface 116 and at the second backing portion on the first major surface 116 and there is no adhesive at the central area 114.

In use, the device 200 is applied to the central area 114 of the backing 110. Then, the adhesive 130 on the first major surface 116 at first backing portion 120 is put in contact with the adhesive 130 on the first major surface 116 at the second backing portion 122. The backing 110 substantially surrounds the device 200 like shown in FIGS. 2 and 3. Also as shown, when folded, the perimeter 112 at the first backing portion 120 and perimeter 112 at the second backing portion 122 typically aligns. When the perimeter 112 aligns in the folded position, the adhesive 130 is not exposed for contact with the environment.

A backing 110 can be tightly enclosed around the device 200, such as shown in FIG. 2. It is especially helpful for the backing 110 to enclose as close around the device 200 without allowing for a gap or opening through which the device 200 could be removed. For example, in FIG. 2. the sealing film 100 fully closes on all sides of the device 200 with a narrowing closure around the portion of the device 200 that exits the sealing film 100.

The device 200 contained within the sealing film 100 can be any device where attempts at tampering to gain access to the device 200 would desirable. For example, when the device 200 is a device for vascular access to a patient, it is desirable to limit the patient from accessing the device 200 to introduce undesirable drugs into the patient's vascular system. In some instances, a user may want to access the device. The user will attempt to break or tear apart the backing 110 to gain access to the device 200. If the backing 110 is entirely torn, then it will be visually apparent that the user gained access to the device 200. If there is a tear strip 170 that is broken, then it will be visually apparent that the user gained access to the device 200. Another possibility is if the user attempts to separate the backing 110 where the adhesive 130 has enclosed the medical device 200. In such an instance, it could be possible for the user to separate the adhesive 130 between the first backing portion 120 and second backing portion 122 to open the sealing film 100, gain access to the device 200, and then reclose the adhesive 130.

To address the problem of an attempt at separating the adhesive 130 between the first backing portion 120 and second backing portion 122 to open the sealing film 100, gain access to the device 200, and then reclose the adhesive 130, the sealing film 100 further the tamper evident layer 180. The tamper evident layer 180 has a first major surface 186 at the second major surface 118 of the backing 110. It is understood that there could be intervening layers between the backing 110 and the tamper evident layer 180. The tamper evident layer 180 is adjacent to and along a substantial portion of the perimeter 112 typically at both the first backing portion 120 and second backing portion 122. The adhesive 130 at the first backing portion 120 contacts the second backing portion 122 to form an adhesive bond. The force to break the adhesive bond is greater than the force separate the tamper evident layer 180 from the backing 110. Therefore, when a user attempts to peel apart the adhesive 130 at the perimeter 112 by picking, pulling, or forcing the backing 110 apart from the adhesive 130, the tamper evident layer 180 will separate from the backing 110 before the adhesive 130 separates from the backing 110. Partial or complete removal of the tamper evident layer 180 will make it apparent that the user was attempting tampering.

The tamper evident layer 180 is held to the backing 110 by relatively weak bonding force. The tamper evident layer 180 can be secured to the backing 110 by adhesive bond, thermal bond, electrostatic, or other bonding mechanisms. The securement typically will not allow for the tamper evident layer 180 to be resecured to the backing 110 if it has been separated. Meaning, once removed, reapplying the tamper evident layer 180 would be difficult.

Also, typically there is a visual contrast between the tamper evident layer 180 and the underlying backing layer 100. For example, one may be transparent and one may be opaque; one may be a first color and one maybe a second color; one may have a first texture and one may have a second texture. The tamper evident layer 180 is generally thin, flexible, conformable, and drapable. The tamper evident layer 180 may be formed from a number of different materials, similar to those that could be used for the backing 110. Typically, the tamper evident layer 180 would not be easily punctured or if punctured, a puncture would be apparent. Typically, the tamper evident layer 180 has structural integrity to not easily rip or tear. The tamper evident layer 180 may be made from polymeric films, foams, paper, non-woven and woven fibrous webs, knits. In some embodiments, a transparent substrate is desirable to allow for viewing of the device 200

Optionally, the sealing film 100 further includes an area of weakness 150. The area of weakness 150 is adjacent to and along a substantial portion of the perimeter 112 at both the first backing portion 120 and second backing portion 122. The adhesive 130 at the first backing portion 120 contacts the second backing portion 122 to form an adhesive bond. The force to break the adhesive bond is greater than the force to break the backing 110 at areas of weakness 150 in the backing 110. Therefore, when a user attempts to peel apart the adhesive 130, in addition to the tamper evident layer 180 separating from the backing 110, picking, pulling, or forcing the backing 110 apart from the adhesive 130, the area of weakness 150 will cause a tear, rip, or break in the backing 110 before the adhesive 130 separates from the backing 110. The tear, rip, or break in the backing 110 will make it apparent that the user was attempting tampering.

The embodiment shown in FIGS. 1-3 show the backing 110 and tamper evident layer 180. (FIG. 2 shows optional areas of weakness 150 that are a plurality of slits 150 in the backing 110). In this embodiment, the tamper evident layer 180 extends over the entire backing 110. Therefore, when the first backing portion 120 overlaps the second backing portion 122 in use, like shown in FIGS. 2 and 3, attempts at separating the first backing portion 120 from the backing second portion 122 will cause the tamper evident layer 180 to separate from the backing 110 before the adhesive 120 separate from either the first backing portion 120 or second backing portion 122.

Figure 4:
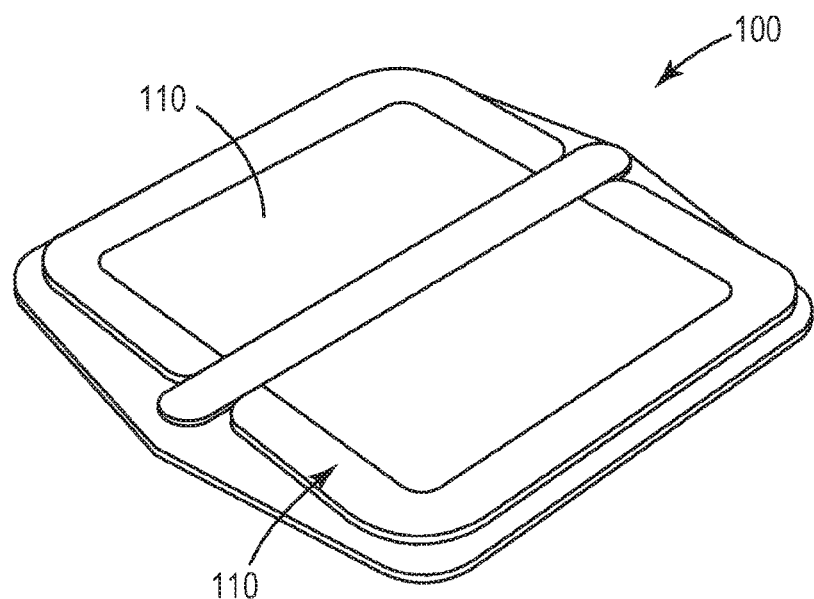
FIG. 4 is a view a second embodiment of a sealing film for tamper-evident protection of a device.

FIG. 4 is a second embodiment of a sealing film 100 for tamper-evident protection of a device (device not shown). This embodiment is substantially similar to the embodiment described in FIGS. 1-3, however in this embodiment, the tamper evident layer 180 is only located adjacent the perimeter 112 of the sealing film 100 and is not overlying the central area 114. The advantage of this construction, when the tamper evident layer 180 is not over the central area 114, is the overall sealing film 100 is more flexible and conformable.

Typically, the sealing film 100 may further have a release liner 190 the covers the adhesive 130 prior to the application of the sealing film 100 to the device. The release liner 190 protect the adhesive 130 from contaminants.

The sealing film 100 can be colored, transparent, or opaque. The sealing film 100 can include fillers such that upon stretching or pulling the film will change from transparent to opaque to further assist in indicating tampering. The sealing film 100 can include printed indicia on the first major surface 116 to indicate the proper location or placement for the inserted device 100.

Although specific embodiments have been shown and described herein, it is understood that these embodiments are merely illustrative of the many possible specific arrangements that can be devised in application of the principles of the invention. Numerous and varied other arrangements can be devised in accordance with these principles by those of skill in the art without departing from the spirit and scope of the invention. The scope of the present invention should not be limited to the structures described in this application, but only by the structures described by the language of the claims and the equivalents of those structures.

What is claimed is:

1. A sealing film for surrounding a device, the sealing film comprising:
   a backing, comprising:
      a first major surface;
      a second major surface opposite the first major surface and having a perimeter surrounding a central area;
      a first backing portion; and
      a second backing portion;
   an adhesive on the first major surface of the backing at least at the perimeter; and
   a tamper evident layer separably connected to the second major surface of the backing and extending along a substantial portion of the perimeter.

2. The sealing film of claim 1, wherein the adhesive is located on the first backing portion and contacts the second backing portion to form an adhesive bond; and
   wherein an amount of force required to break the adhesive bond is greater than an amount of force required to separate the tamper evident layer from the backing.

3. The sealing film of claim 1, further comprising a tear strip separating the first backing portion from the second backing portion, wherein the tear strip is separably connected to the first backing portion and the second backing portion.

4. The sealing film of claim 1, wherein the first backing portion and the second backing portion are symmetrical.

5. The sealing film of claim 1, wherein the adhesive is a permanent, pressure sensitive adhesive.

6. The sealing film of claim 1, wherein the adhesive is a contact adhesive.

7. The sealing film of claim 1, wherein the adhesive is on substantially the entire first major surface of the backing.

8. The sealing film of claim 1, wherein the adhesive does not extend onto the central area.

9. The sealing film of claim 1, wherein the tamper evident layer extends adjacent to and along all of the perimeter of the backing.

10. The sealing film of claim 1, wherein the tamper evident layer comprises a continuous film over the backing.

11. The sealing film of claim 1, wherein the tamper evident layer is a frame adjacent to the perimeter and does not cover the central area.

12. The sealing film of claim 1, wherein the tamper evident layer is located on the second major surface of the backing.

13. The sealing film of claim 1, wherein the tamper evident layer is releasably secured to the backing by the adhesive.

14. The sealing film of claim 1, wherein the tamper evident layer is visually distinct from the backing.

15. The sealing film of claim 1, wherein the tamper evident layer is visually distinct from the backing via a difference in at least one of color or opacity.

* * * * *